June 24, 1930.   J. L. MENZIES   1,768,368

VEHICLE ROOF

Filed Feb. 7, 1929

Inventor:
J. L. Menzies,
By Mawhinney & Mawhinney,
Attys.

Patented June 24, 1930

1,768,368

UNITED STATES PATENT OFFICE

JAMES LISTER MENZIES, OF COVENTRY, ENGLAND

VEHICLE ROOF

Application filed February 7, 1929, Serial No. 338,191, and in Great Britain February 25, 1928.

This invention relates to the roofs of vehicles, preferably motor vehicles, and it has for its object to provide simple means whereby such roofs can be prevented from drumming.

According to this invention, the roof frame is flexibly mounted and supported upon the vehicle sides. Thus tremors in the chassis and body are not transmitted to the roof, and drumming does not occur.

In the accompanying drawings.

Like numerals indicate like parts throughout the drawings.

Figure 1:
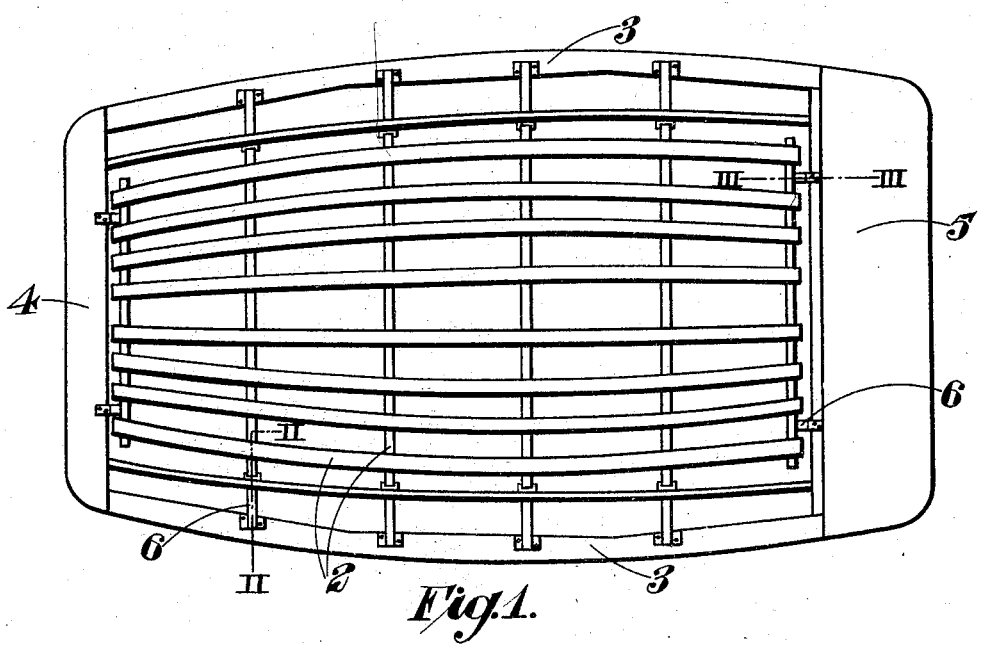
Figure 1 is a plan of one construction of roof uncovered and in accordance with this invention.

The roof frame 2 is preferably in the nature of a light grid consisting of longitudinal and transverse wooden or metal members, more or less widely spaced. This frame may carry a ventilator, roof lights and other fittings, but it is quite independent from the remainder of the body. At the edges this frame is at any number of points flexibly mounted upon the top of the sides of the body, for example, on or from the cant rails 3 and front and rear transverse members 4 and 5.

Various methods of flexibly supporting the frame 2 on the body sides may be adopted. For instance, the frame may be pivoted to the body sides, or be supported upon metallic or other springs or cushions thereon, or a combination of these may be used.

A simple and convenient arrangement is to attach to the cant rails and to the front and back cross-members 4 and 5 brackets 6 which project inwards from the body and to provide the roof frame 2 with outwardly projecting brackets 7, these brackets lying one above the other. To each bracket is then attached one side of a connecting member such as the rubber ring 8 or block or a bow forming a kind of bow spring connection between the frame and the body side.

Figure 2:
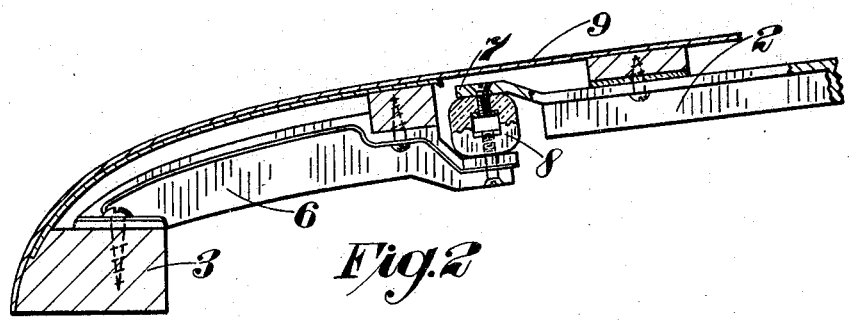
Figure 2 is a cross section on the line II. II of Figure 1.
Figure 3:
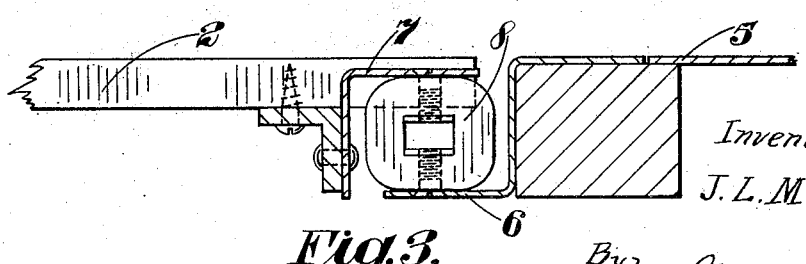
Figure 3 is a section on the line III. III of Figure 1.

The hood covering material 9 (Figure 2) is stretched completely over the roof and secured to the body sides 3, cant rails and transverse members, so that the actual construction is concealed and a conventional appearance obtained.

In this way the roof is completely flexible as regards the body and vibrations from the body are not transmitted to it.

What I claim as my invention and desire to secure by Letters Patent of the United States is:—

1. In a vehicle, the combination with side, front and rear roof members, of a roof frame, brackets secured, respectively, to said roof members and said roof frame, resilient connections between said brackets for supporting said roof frame from said roof members, and flexible covering material stretched against said roof frame and secured to said roof members.

2. In a vehicle, the combination with side, front and rear roof members, of a roof frame of light grid form, brackets secured, respectively, to said roof members and said roof frame, resilient connections between said brackets for supporting said roof frame from said roof members, and flexible covering material stretched against said roof frame and secured to said roof members.

3. In a vehicle, the combination with side, front and rear roof members, of a roof frame, opposed brackets secured respectively to said roof members and said roof frame, rubber compression rings between said brackets for supporting said roof frame, from said roof members, and flexible covering material stretched against said roof frame and secured to said roof members.

In testimony whereof I affix my signature.

JAMES LISTER MENZIES.